Aug. 5, 1969 L. C. FRIEND 3,459,904

CARD READER HAVING CARD-ALIGNING MEANS AND WIPING-CONTACT MEANS

Filed Sept. 22, 1966 4 Sheets-Sheet 1

CARD READER HAVING CARD-ALIGNING MEANS AND WIPING-CONTACT MEANS

Filed Sept. 22, 1966 4 Sheets-Sheet 3

CARD READER HAVING CARD-ALIGNING MEANS AND WIPING-CONTACT MEANS

Filed Sept. 22, 1966 4 Sheets-Sheet 4

United States Patent Office 3,459,904 Patented Aug. 5, 1969

3,459,904

CARD READER HAVING CARD-ALIGNING MEANS AND WIPING-CONTACT MEANS

Lindsay Carlton Friend, Camp Hill, Pa., assignor to AMP Incorporated, Harrisburg, Pa.

Filed Sept. 22, 1966, Ser. No. 581,349
Int. Cl. H01h 43/08; G06k 7/06
U.S. Cl. 200—46 7 Claims

ABSTRACT OF THE DISCLOSURE

A card reader comprises a movable reader head and a stationary contact assembly between which a data card is received to read coded information therefrom. The reader head is moved toward the stationary contact assembly and in so doing, it aligns the data card in position along the stationary contact assembly in proper alignment with contact sensing springs of the movable reader head so that the coded information of the data card can be read therefrom.

This invention relates to a card reader and more particularly to an automatically operated card reader.

Cards having coded information thereon are being used in an ever increasing number in various fields. A few of the fields in which these cards are utilizable are: personnel identification, account identification, credit capability, accounting, process control, etc. Equipment is necessary to read the coded information; this equipment must be capable of effectively reading the coded information, and this equipment must generally be readily interfaced with existing equipment.

An object of the invention is to provide a card reader to read the coded information on a data card in a reliable and effective manner.

Another object is the provision of a card reader which is automatically operable when a card to be read is inserted within a card-reading area of the card reader.

A further object is to provide a card reader having aligning means to automatically align a card to be read within the card-reading area of the card reader.

An additional object of the invention is the provision of means on the card to be read and on the card reader to assure proper positioning of the card within the card-reading area in order to effect the reading operation of the card reader.

A still further object is to provide a card reader having an operating mechanism to make the contact members of the movable contact assembly wipingly engage the contact members of the stationary contact assembly in a reciprocatory manner.

Still an additional object is the provision of a card reader that can readily interfere with existing equipment.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing and other objects are attained by a preferred embodiment of a card reader which comprises a frame, a stationary contact assembly on the frame, a movable contact assembly movably mounted on the frame, the stationary contact assembly and the movable contact assembly defining a card-reading area therebetween, operating means operatively connected to the movable contact assembly to move the movable contact assembly from a normally inoperative position to an operative position, and means in association with the operating means to move the movable contact assembly in substantially inclined, arcuate and parallel directions with respect to the stationary contact assembly during the moving of the movable contact assembly relative thereto.

Figure 1:
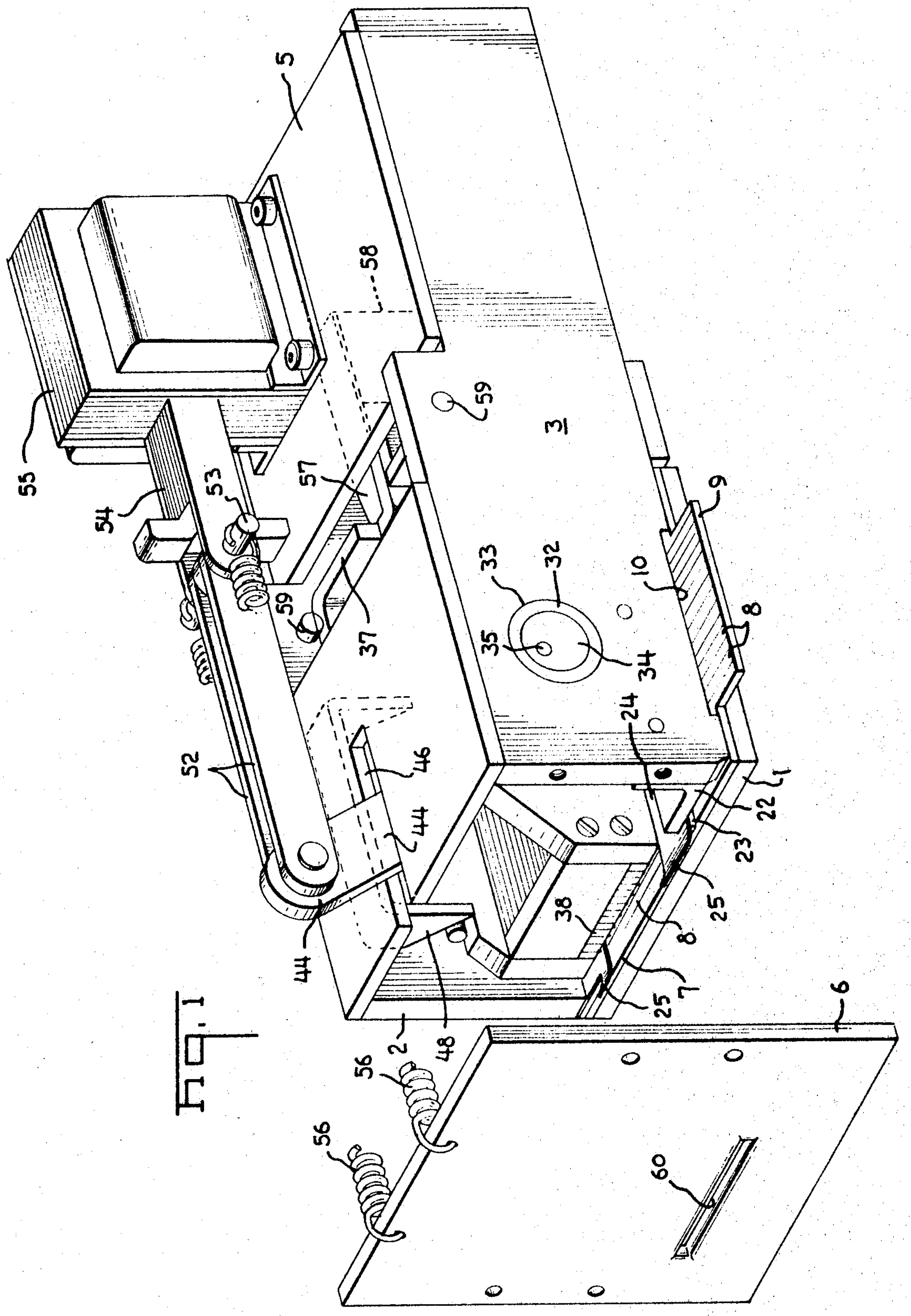
FIGURE 1 is a perspective view of the card reader with a front plate exploded therefrom.
Figure 2:
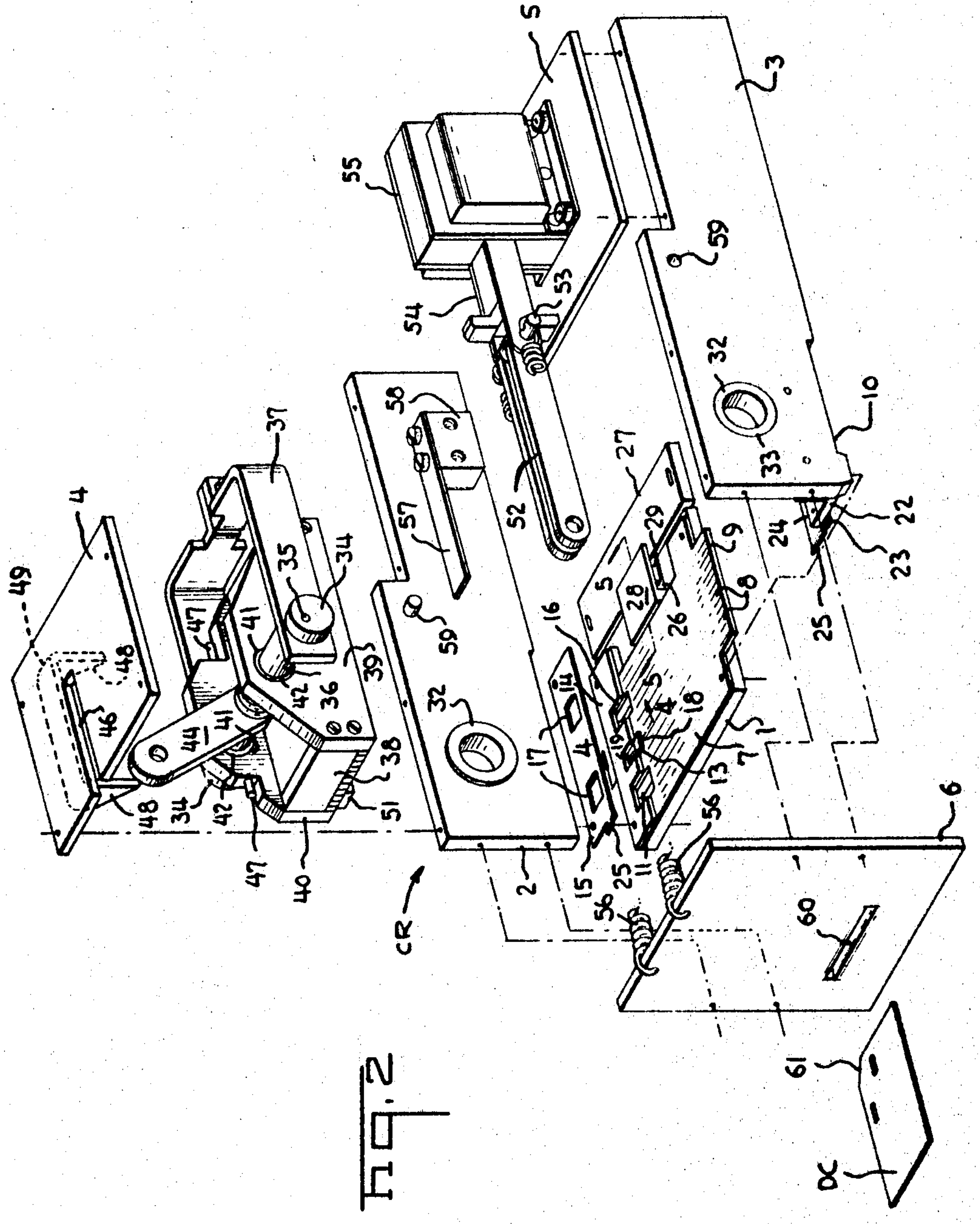
FIGURE 2 is a perspective and exploded view of the components of the card reader.

Turning now to the drawings, there is illustrated a card reader CR for reading the coded information on data cards. The contact-carrying plate 1 is secured to edges of side plates 2 and 3 and plates 4 and 5 are secured to opposite edges of side plates 2 and 3. A front plate 6 is secured to ends of side plates 2 and 3 adjacent plates 1 and 4. The various plates in their assembled condition define a frame with plates 1 and 4 disposed opposite each other.

Contact-carrying plate 1 has a stationary contact assembly 7 thereon which comprises spaced conductive members 8 disposed in a dielectric material in the form of a printed circuit board or the like. Contact assembly 7 includes a projection 9 along one side which is mateable with a recess 10 in side plate 3 and projection 9 extends outwardly from side plate 3 for engagement with a conventional printed circuit connector (not shown) to electrically connect conductive members 8 to external leads in the printed circuit connector.

Figure 4:
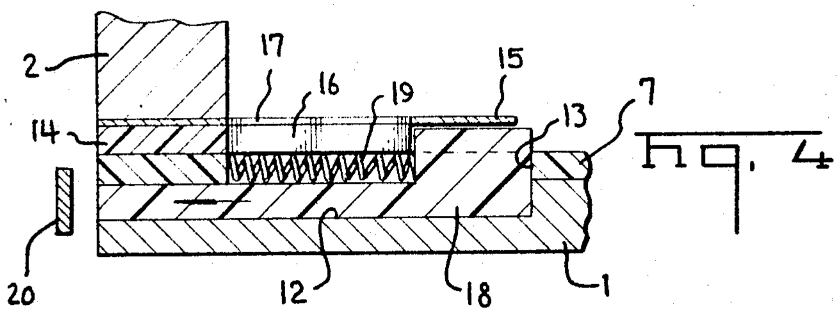
FIGURE 4 is a view taken along lines 4—4 of FIGURE 2.
Figure 7:
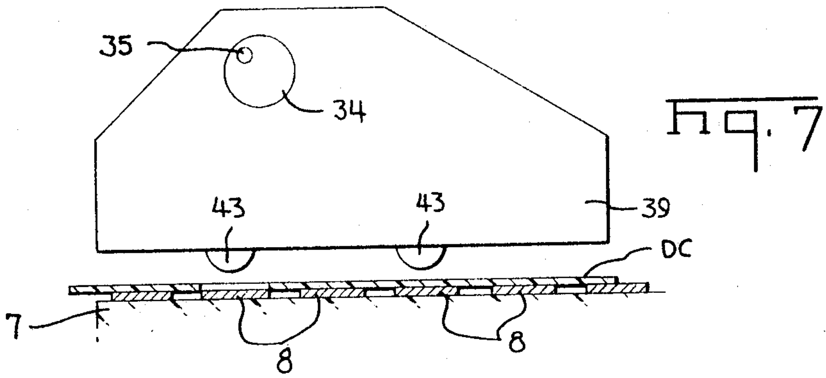
FIGURES 7–9 are diagrammatic views illustrating the operation of the card reader.

Openings 11 extend through plate 1 and contact assembly 7 along one side of the plate and contact assembly. A recess 12 is disposed in plate 1 between openings 11 as illustrated in FIGURE 4. An opening 13 is located in stationary contact assembly 7 in communication with recess 12. A spacer 14 is mounted on top of contact assembly 7 and a retaining member 15 is mounted on top of spacer 14. Spacer 14 includes recesses 16 in communication with openings 11 and recess 12 while retaining member 15 has openings 17 in communication with openings 11 and recesses 16.

An L-shaped switch-actuating member 18 has its long leg disposed in recess 12 of plate 1 and its short leg movable within opening 13 in contact assembly 7 and recess 16 in spacer 14. The short leg of member 18 is disposed in alignment with the free end of retaining member 15 while the outer end of the long leg of actuating member 18 is captured between plate 1 and contact assembly 7 to retain actuating member 18 in position. A coil spring 19 is disposed in opening 13 along the long leg of actuating member 18. One end of coil spring 19 is disposed against one end of opening 13 while the other end is in engagement with the short leg of actuating member 18. Coil spring 19 is under compression to normally maintain the short leg of actuating member 18 against another end of opening 13 and the inner end of recess 12. The long leg of actuating member 18 is in alignment with an actuating level 20 of a switch 21 so that actuating member 18 can be moved into engagement with actuating lever 20 to operate switch 21.

Figure 3:
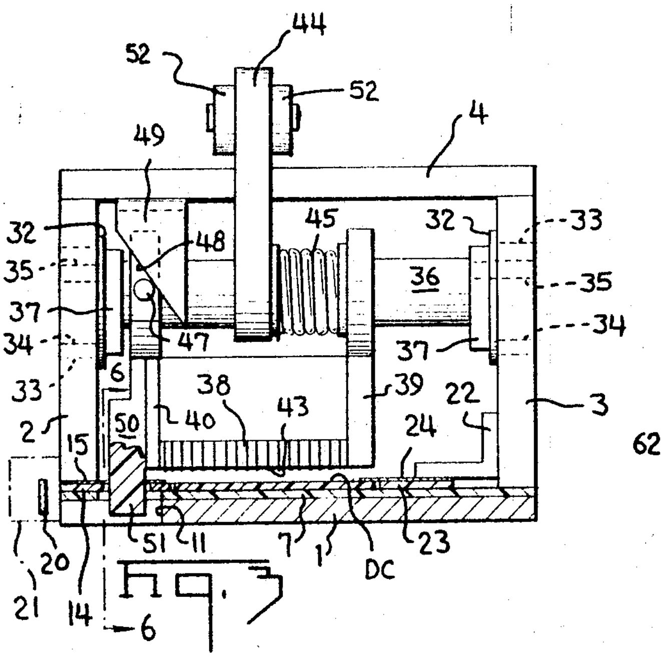
FIGURE 3 is a front elevational view of the card reader.
Figure 6:
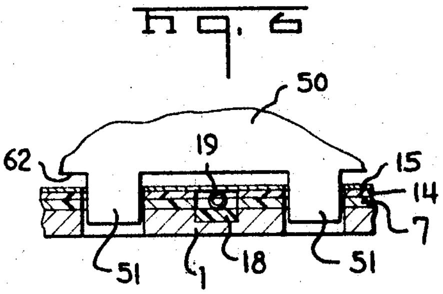
FIGURE 6 is a view taken along lines 6—6 of FIGURGE 3.

A bracket 22 is mounted on the inside surface of side plate 3 and a spacer 23 and retaining member 24 are mounted on bracket 22 with bracket 22 maintaining spacer 23 in engagement with stationary contact assembly 7 as illustrated in FIGURES 1 and 3. As can be discerned, the free ends of retaining members 15 and 24 extend outwardly beyond spacers 14 and 23 to retain data card DC in position on the stationary contact assembly 7. Retaining members 15 and 24 have curved sections 25 at their front ends to facilitate the insertion of the data card between contact assembly 7 and the retaining members.

Figure 5:
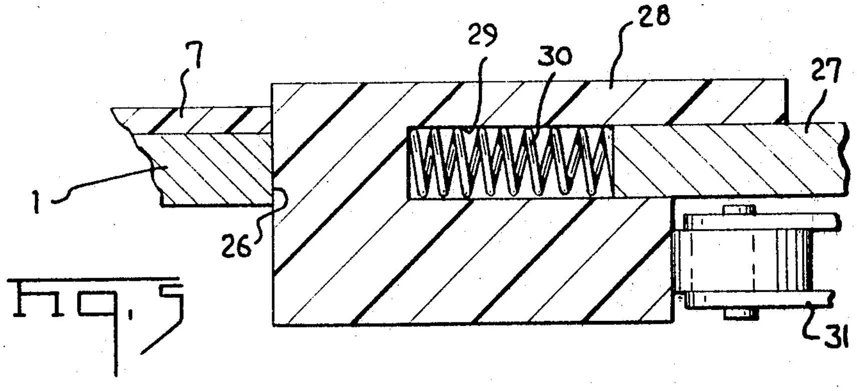
FIGURE 5 is a view taken along lines 5—5 of FIGURE 2.

A recess 26 is disposed in the inner end of plate 1. A guide plate 27 is mounted on side plates 2 and 3 against the inner end of plate 1. A switch actuating member 28 is disposed in recess 26 and it has a slot 29 located therein for mounting the actuating member on guide plate 27 so as to be movable therealong. A coil spring 30 is disposed within slot 29 and in engagement with guide plate 27 so as to bias actuating member 28 against the inner end of recess 26 and against stationary contact assembly 7 as illustrated in FIGURE 5. Switch-actuating member 28 is moved into engagement with a switch-actuating lever 31 to actuate another switch (not shown) which is connected in series with switch 20.

Plastic bearings 32 are mounted in openings 33 in side plates 2 and 3. Discs 34 are located respectively in bearings 32. Eccentric pins 35 on the ends of shaft 36 extend through openings in the legs of U-shaped yoke 37 and into discs 34. Eccentric pins 35 are disposed in discs 34 in such a manner to render discs 34 as eccentrics. Thus, the ends of shaft 36 are eccentrically mounted within eccentrics. A movable contact assembly 38 includes mounting members 39 and 40. Each of members 39 and 40 has an opening 41 in which a plastic bearing 42 is mounted. Shaft 36 is mounted within plastic bearings 42 so that movable contact assembly 38 is pivotally and slidably mounted on this shaft. Movable contact assembly 38 is preferably of the kind completely disclosed in U.S. patent application, Ser. No. 441,179, filed Mar. 19, 1965, wherein each of contact members 43 comprises two identical contact elements which are moved into wiping engagement with conductive members 8 of stationary contact assembly 7. If desired, stationary contact assembly 7 can also take the form disclosed in the above-mentioned application.

One end of lever 44 is mounted on shaft 36 and is secured thereon between mounting members 39 and 40. A spring 45 is disposed under compression between lever 44 and mounting member 39. Lever 44 is disposed within a slot 46 in plate 4 and is movable therein. Plastic pins 47 are mounted on mounting member 40 and are in engagement with respective tapered surfaces 48 of a guide member 49 which is secured to the inner surface of plate 4. Spring 45 biases pins 47 against tapered surfaces 48. A card-engaging member 50 is mounted on mounting member 40 and includes spaced legs 51 disposed in and movable in openings 11, recesses 16 and openings 17. Legs 51 are engageable with an edge of a data card.

The other end of lever 44 is pivotally mounted to one end of levers 52. A pivot pin 53 pivotally connects the other ends of levers 52 to an armature 54 of a fast reaction time solenoid 55 which in turn is mounted on plate 5. Springs 56 are connected between front plates 6 and pivot pin 53 to maintain the lever assembly of levers 44 and 52 and armature 54 in a normally inoperative position with movable contact assembly 38 spaced from stationary contact assembly 7. A spring 57 is secured on blocks 58 which in turn is mounted on side plate 2 and spring 57 engages yoke 37 to maintain yoke 37 in a normal position of rest against pins 59 in side plates 2 and 3. Yoke 37 in its normal position of rest likewise maintains pins 35 and eccentrics 34 in a normal position of rest.

Front plate 6 includes a slot 60 through which data card DC is introduced into the card-receiving area of the card reader which is defined by stationary contact assembly 7, movable contact assembly 38, spacers 14 and 23, retaining members 15 and 24 and switch-actuating member 28. Data card DC has a tapered corner 61 which is engageable with switch-actuating member 18 to move member 18 against the bias of spring 19 and into engagement with actuating lever 20 to actuate switch 21. If a non-tapered corner of the data card is brought into engagement with switch-actuating member 18, the switch-actuating member will not be moved into engagement with actuating lever 20. Thus, tapered corner 61 of the data card and switch-actuating member 18 define a polarizing means to assure the proper positioning of the data card within the card-reading area as well as the assurance of receiving only data cards that are to be used in the present card reader.

Operation of the card reader is according to the following:

Data card DC is inserted through slot 60 in front plate 6 within the card-receiving area of the card reader, tapered corner 61 of the data card being inserted into the card-receiving area in alignment with switch-actuating member 18. As the data card is pushed into the card-receiving area and with tapered corner 61 in alignment with switch-actuating member 18, tapered corner 61 engages switch-actuating member 18 causing this member to move outwardly into engagement with actuating lever 20 to actuate switch 21. Switch 21 and the switch actuated by switch-actuating lever 31 are connected in series with solenoid 55 so that both the switches have to be actuated before solenoid 55 is energized.

After switch-actuating member 18 has been moved outwardly, the data card is moved further within the card-receiving area and into engagement with switch-actuating member 28 which is moved in the direction of the insertion of the data card within the card-receiving area thereby moving switch-actuating member 28 into engagement with switch-actuating lever 31 to actuate the switch thereof.

When the latter switch is actuated, solenoid 55 is energized causing armature 54 to be moved within the solenoid. The movement of armature 54 within solenoid 55 causes the lever assembly comprising levers 44 and 52 to be carried along with armature 54 against the bias of springs 56. The movement of lever 44 within slot 46 also rotates shaft 36 about eccentric pins 35 thereby moving movable contact assembly 38 toward stationary contact assembly 7. As shaft 36 is being rotated by the lever asembly, the movement of movable contact assembly 38 toward stationary contact assembly 7 is guided by the engagement of pins 47 with tapered surfaces 48 on guide member 49, and spring 45 causes pins 47 to be maintained in engagement with tapered surfaces 48. Pins 47 in moving along tapered surfaces 48 cause movable contact assembly 38 to move in an inclined direction thereby causing legs 51 of card-engaging member 50 to move the data card into engagement with spacer 23 to properly align the coded apertures in the data card with contact members 43 in the movable contact assembly.

The movable contact assembly continues to be moved in an inclined direction until the data card is properly positioned against spacer 23 whereupon the movable contact assembly moves in a perpendicular direction with respect to the axle of shaft 36 and this perpendicular movement continues until stop surface 62 on card-engaging member 50 engages retaining member 15 thereby stopping the downward movement of movable contact assembly 38 with respect to stationary contact assembly 7.

Figure 8:
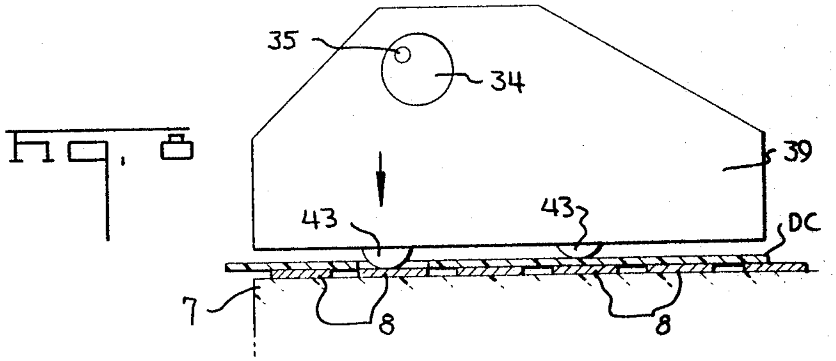

As the movable contact assembly is moving toward stationary contact assembly, it moves in a slightly arcuate path causing contact members 43 that extend through coded apertures in the data card and into engagement with the conductive members 8 to wipe the conductive members in a forward manner as indicated in FIGURE 8.

Figure 9:
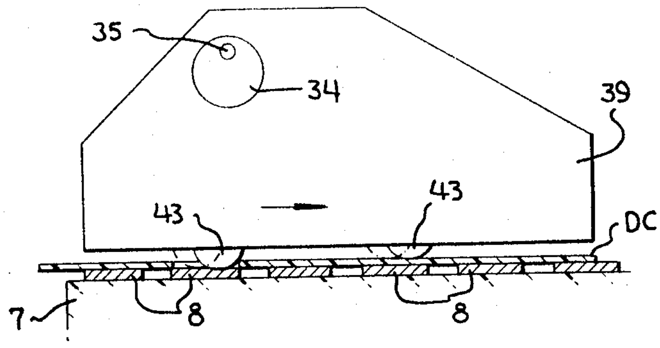

When movable contact assembly 38 has reached its stopped position with stop surface 62 in engagement with retaining member 15, armature 54 and lever assembly 44 and 52 continues to move shaft 36, and, since movable contact assembly 38 cannot move any further toward stationary contact assembly 7, the movable contact assembly is moved in a parallel manner with respect to stationary contact assembly 7 via eccentric discs 34 and yoke 37 against the bias of spring 57, as illustrated in FIGURE 9. The contact members wipe the conductive members in a reverse direction. The action of the contact members on the conductive members represent a reciprocatory wiping action. The reading cycle of the card reader is now completed with the coded information represented by the coded information represented by the coded apertures in the data card being read out via appropriate circuitry to be utilized by any existing equipment.

Now that the reading cycle has been completed, armature 54 and levers 44 and 52 are moved to their normally inoperative positions via springs 56 which in turn permits spring 57 to move yoke 37 and eccentric discs 34 to their normally inoperative positions, and, shaft 36, in moving to its normally inoperative position, moves the movable contact assembly to its normally inoperative position. As the movable contact assembly is being moved to its normally inoperative position, data card DC is automatically moved moved along the card-reading area via switch actuating member 28 so that part of the card extends outwardly from slot 6 so as to be easily grasped.

Plastic pins 47 in engagement with tapered surfaces 48 on guide member 49 perform two functions. The first function is to assure inclined movement of the movable contact assembly in its movement toward and away from the stationary contact assembly and the second function is to stabilize the movable contact assembly.

As can be discerned, there has been dislosed a unique and novel card reader to read the coded information on a data card and the contact members on the movable contact assembly are made to forwardly and rearwardly engage the conductive portions on the stationary contact assembly to effect a reciprocatory wiping engagement between the contact members of the contact assemblies.

It will, therefore, be appreciated that the aforementioned and other desirable objects have been achieved; however, it should be emphasized that the particular embodiment of the invention, which is shown and described herein, is intended as merely illustrative and not as restrictive of the invention.

The invention is claimed in accordance with the following:

1. In a card reader to read coded information of a data card, a movable reader head having a plurality of electrical contact sensing springs a stationary contact assembly defining a card-receiving area and having a plurality of electrical contacts, operating means connected to said movable reader head to move said reader head to a reading poistion adjacent said stationary contact assembly to move the sensing springs through coded openings in the data card and in electrical engagement with respective electrical contacts, stop means provided by said stationary contact assembly, first engaging means provided by said reader head for engagement with the data card in said card-receiving area when said reader head is moved to said reading position thereby moving the data card against said stop means, guide means disposed adjacent said movable reader head, second engaging means provided by said reader head for engagement with said guide means for guiding said reader head during its movement to said reading position so that said sensing springs are aligned with the coded openings in the data card, and means concected to said operating means to move said reader head to a normally inoperative position.

2. In a card reader according to claim 1 wherein means in said card receiving area and on a card to be read comprise a polarizing means to assure proper positioning of the card to be read within said card receiving area.

3. In a card reader according to claim 1 wherein means are provided in said card-receiving area to automatically actuate said operating means when a card to be read has been properly positioned within said card-receiving area.

4. In a card reader according to claim 1 wherein means are provided to automatically partially eject a card to be read from said card-receiving area after coded information on said card has been read by said movable reader head and said stationary contact assembly.

5. In a card reader to read coded information of a data card, a movable reader head having a plurality of electrical contact sensing springs, a stationary contact assembly defining a card-receiving area and having a plurality of electrical contacts, shaft means carrying said movable reader head, side members disposed outwardly from said reader head, movable disc means in said side members, eccentric means provided between said shaft means and said disc means, operating means connected to said shaft means to rotate said shaft means about said eccentric means thereby moving said reader head toward said contact assembly with the data card therebetween, and means connected to said disc means to permit back and forth movement of said disc means when said shaft means is rotated to provide a wiping action of said sensing springs against said electrical contacts.

6. In a card reader to read coded information of a data card, a movable reader head having a plurality of individual electric contact sensing springs, a stationary contact assembly defining a card-receiving area, an eccentric shaft connected to said reader head for moving it toward said contact assembly with the data card therebetween, said shaft being spaced from the transverse to said assembly and having axial pins eccentrically projecting from its respective ends, and mounting discs for said pins, said discs being movable back and forth when said shaft is rotated up and down to provide a wiping action of said sensing springs against said contact assembly.

7. The arrangement in claim 6 wherein said discs are mounted in a spring held pivoted yoke, the force of said pins in said discs when said shaft is rotated downward moving said yoke against the action of its spring.

References Cited

UNITED STATES PATENTS

| | | | |
|---|---|---|---|
| 2,864,909 | 12/1968 | Cobb | 200—46 |
| 3,034,711 | 5/1962 | Cohen. | |
| 3,042,299 | 7/1962 | Sherman | 200—61.11 |

ROBERT K. SCHAEFER, Primary Examiner

D. SMITH, Jr., Assistant Examiner

U.S. Cl. X.R.

235—61